(12) United States Patent
Moraczewski et al.

(10) Patent No.: US 8,188,169 B2
(45) Date of Patent: May 29, 2012

(54) POLYOXYMETHYLENE COMPOSITIONS AND ARTICLES MADE FROM THESE

(75) Inventors: Jerome P. Moraczewski, Cochranville, PA (US); Joel M. Pollino, Elkton, MD (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 303 days.

(21) Appl. No.: 12/547,986

(22) Filed: Aug. 26, 2009

(65) Prior Publication Data

US 2010/0056673 A1 Mar. 4, 2010

Related U.S. Application Data

(60) Provisional application No. 61/092,876, filed on Aug. 29, 2008.

(51) Int. Cl.
| | |
|---|---|
| *C08B 37/00* | (2006.01) |
| *C08L 3/02* | (2006.01) |
| *C08L 5/16* | (2006.01) |
| *C08L 3/00* | (2006.01) |
| *C08L 89/00* | (2006.01) |
| *C08L 61/02* | (2006.01) |
| *D21H 19/54* | (2006.01) |

(52) U.S. Cl. .............. 524/48; 524/47; 525/398
(58) Field of Classification Search .......... 525/398; 524/47, 48
See application file for complete search history.

(56) References Cited

U.S. PATENT DOCUMENTS

| 4,689,373 | A | * | 8/1987 | Auerbach et al. ............. 525/398 |
|---|---|---|---|---|
| 4,760,119 | A | * | 7/1988 | Liotta et al. .................. 525/398 |
| 5,011,890 | A | | 4/1991 | Novak |
| 5,106,888 | A | | 4/1992 | Kosinski |
| 5,540,663 | A | * | 7/1996 | Kroner et al. ................. 428/221 |
| 5,688,897 | A | * | 11/1997 | Tanimura et al. ............. 528/242 |
| 2002/0006985 | A1 | * | 1/2002 | Sau ............................... 523/332 |
| 2003/0171459 | A1 | * | 9/2003 | Sau ............................... 524/58 |
| 2005/0032950 | A1 | * | 2/2005 | Lee et al. ....................... 524/261 |
| 2005/0288438 | A1 | | 12/2005 | Mandi |
| 2008/0286577 | A1 | * | 11/2008 | Lee et al. ....................... 428/412 |
| 2011/0028609 | A1 | * | 2/2011 | Lawson .......................... 524/47 |

FOREIGN PATENT DOCUMENTS

| JP | 05017664 A * | 1/1993 |
|---|---|---|
| WO | 9401488 A1 | 1/1994 |
| WO | WO00/17270 | 3/2000 |
| WO | PCT/US2009/055490 | 10/2009 |

OTHER PUBLICATIONS

Machine Translation of JP 05017664 A.*

* cited by examiner

*Primary Examiner* — Liam Heincer
(74) *Attorney, Agent, or Firm* — Loretta Smith; Otha Weaver

(57) ABSTRACT

Polyoxymethylene compositions that include 90 to 99.9 weight percent of at least one polyacetal polymer and 0.1 to 10 wt % of at least one polysaccharide substantially free of acidic material selected from the group consisting of amylopectin from maize and soluble starch where the weight percent of the polymer and the polysaccharide are based on their combined weight. Articles made from these compositions.

6 Claims, No Drawings

POLYOXYMETHYLENE COMPOSITIONS AND ARTICLES MADE FROM THESE

CROSS-REFERENCE TO RELATED APPLICATION

This application claims the benefit of priority under 35 U.S.C. 119(e) to U.S. Provisional App. No. 61/092,876, filed 29 Aug. 2008 and currently pending.

FIELD OF INVENTION

The present invention relates to thermally stabilized polyoxymethylene resin compositions that include at least one polysaccharide.

BACKGROUND OF INVENTION

Polyoxymethylene (POM, also known as polyacetal) has excellent tribological characteristics, hardness, stiffness, moderate toughness, low coefficient of friction, good solvent resistance, and the ability to crystallize rapidly, making polyoxymethylene resin compositions useful for preparing articles for use in many demanding applications. However, during melt-processing, polyoxymethylenes can degrade and release formaldehyde. For this reason, formaldehyde evolution, measured as thermally evolved formaldehyde (TEF) is often used to determine the heat stability of polyoxymethylene compositions. Other methods for assessing the heat stability of polyoxymethylene include the measurement of weight loss in air over aging at elevated temperatures for prolonged periods, such as 500 to 1000 hrs and the observation of degradative coloration of the resin compositions using the Yellowness index, as defined in ASTM E313-73 (D 1925).

It would be desirable to have polyoxymethylene compositions that exhibited good or excellent thermal stability during melt-processing and aging, as assessed by one or more of the above-mentioned methods.

Int'l App. Pub. No. WO 941488 discloses polyacetal compositions including cyclodextrin as a thermal stabilizer. U.S. Pat. No. 5,011,890 discloses polyacetal compositions including polymers having formaldehyde reactive nitrogen groups such as polyacrylamide. U.S. Pat. No. 5,106,888 discloses polyacetal compositions including microcrystalline cellulose (MCC) as a thermal stabilizer with polyamide. The use of epoxidized fatty acid stabilizer as polyoxymethylene stabilizers has been disclosed in U.S. Pat. App. Pub. No. 2005/0288438.

SUMMARY OF INVENTION

Described herein are polyoxymethylene compositions comprising a) 90 to 99.9 weight percent of at least one polyoxymethylene polymer; and b) 0.1 to 10 weight percent of at least one polysaccharide substantially free of acidic material and selected from the group consisting of amylopectin from maize, and soluble starch, wherein the weight percent of each of a) and b) is based on the total amount a) and b).

Also described herein are articles made from these compositions.

DETAILED DESCRIPTION OF INVENTION

Definitions

The following definitions are to be used in interpreting the claims and the description provided herein:

As used especially in the claims, the indefinite article "a" refers to one, at least one, or more than one of the entities that the article modifies and is not necessarily meant to convey singularity of the modified entity.

As used herein, "soluble starch" refers to a high molecular weight, water-soluble dextrin produced by the partial acid hydrolysis of starch, having the CAS #[9005-84-9].

As used herein, "substantially free of acidic material" refers to, for optimum results, the pH of an aqueous suspension of 1 to 10 weight percent of the polysaccharide should be between 5.5 to 7 for homopolymer polyacetal and between 5.5 to 8 for copolymer polyacetal and more preferably 5.5 to 7 for both homopolymer and copolymer polyacetal.

As used herein, "formaldehyde reactive nitrogen groups" refers to pendant groups on the polymer chain that contain a nitrogen bonded to one or, preferably, two hydrogen atoms.

As used herein, "non-meltable" refers to the fact that the polymeric stabilizer has its "major melting point" above the temperature at which the polyacetal is melt processed and thus remains essentially a solid during melt processing of the polyacetal.

As used herein, "major melting point" is the temperature at which the amount of heat absorbed by the polymeric stabilizer is greatest; it is the temperature at which the polymeric stabilizer shows the greatest endotherm.

Alternatively, a polymeric stabilizer is "non-meltable" if the polymeric stabilizer has its "major melting point" below the temperature at which the polyacetal is melt processed but it does not undergo significant melt flow at that temperature. The melt flow rate of the polymeric stabilizer may not be significant because the polymeric stabilizer has a high viscosity, attributed to, for example, high molecular weight or crosslinking. In the case where the polymeric stabilizer has its "major melting point" below the temperature at which the polyacetal is melt processed, the melt flow rate of the polymeric stabilizer, as measured in accordance with ASTM-D 1238, is preferably less than one-tenth that of the polyacetal. The "major melting point" of the polymeric stabilizer can be determined on a differential scanning calorimeter.

Described herein are thermally stabilized polyoxymethylene compositions that are thermoplastic. They comprise: (a) 90 to 99.9 weight percent of at least one polyoxymethylene (POM) polymer; and (b) 0.1 to 10 weight percent of at least one polysaccharide substantially free of acidic material and selected from the group consisting of amylopectin from maize, and soluble starch, wherein the weight percent of each of (a) and (b) is based on their combined amount. Alternatively, these compositions may consist essentially of (a) and (b).

In addition, these compositions may further comprise (c) 0.1 to 3.0 weight percent of a polymeric stabilizer containing formaldehyde reactive nitrogen groups, wherein the weight percent of each of (a) and (b) is based on their combined amount. Alternatively, these compositions may consist essentially of components (a), (b) and (c).

Moreover, these compositions may also comprise (d) a hydroxyl containing polymer selected from the group consisting of poly(vinyl alcohol), poly(ethylene vinyl alcohol), poly(hydroxyethyl methacrylate), poly(hydroxypropyl methacrylate), and hydrolyzed vinyl acetate/methacrylate copolymer. Alternatively, these compositions may consist essentially of components (a), (b), (c), and (d).

Further, these compositions may include (e) a reinforcing agent selected from the group consisting of glass fiber, carbon fiber, and a combination of these. Alternatively, these compositions may consist essentially of (a), (b), (c), (d) and (e).

Preferably, the amount of polyoxymethylene will range from about 90 to about 99.9 wt % and be based on the total amount of the polyoxymethylene and polysaccharide only. Preferably, the polysaccharide is present at 0.1 to 5.0 weight percent and more preferably at 0.1 to about 2 weight percent of the total weight of these compositions.

Polyoxymethylene Polymers

These compositions comprise polyacetal polymers, also known as polyoxymethylene or POM polymers, which may be one or more homopolymers, copolymers, or a mixture of these. The polyoxymethylene (or polyacetal) polymers described herein can be branched or linear and generally have a number average molecular weight of at least 10,000, preferably 20,000 to 90,000. The molecular weight may be measured: 1) by gel permeation chromatography in m-cresol at 160° C. using a DuPont PSM bimodal column kit with nominal pore size of 60 and 1000 angstrom; or 2) by determining the melt flow using ASTM D1238 or ISO 1133. For injection molding purposes, the melt flow is typically in the range of 0.1 to 100 g/min, preferably from 0.5 to 60 g/min, or more preferably from 0.8 to 40 g/min. Other manufacturing processes that result in films or fibers as well as a blow molding process may give different melt viscosity ranges.

Homopolymers

Polyacetal homopolymers are prepared by polymerizing formaldehyde or formaldehyde equivalents, such as cyclic oligomers of formaldehyde.

Preferred are homopolymers having terminal hydroxyl groups that are-capped by a chemical reaction to form ester or other groups. Preferred end groups for homopolymers are acetate and methoxy.

Co-Polymers

Polyacetal copolymers can contain one or more typical co-monomers, which include acetals and cyclic ethers that lead to the incorporation into the polymer chain of ether units with 2 to 12 sequential carbon atoms. When these compositions include such a copolymer, the quantity of co-monomer will not be more than 20 weight percent, preferably not more than 15 weight percent, and most preferably about two weight percent. Preferable co-monomers include ethylene oxide, butylene oxide and, more preferably 1,3-dioxolane.

In general, preferable polyoxymethylene copolymers are those for which the quantity of co-monomer is about 2 weight percent and are not completely end-capped, but have some free hydroxy ends from the co-monomer unit or are terminated with ether groups. Preferred end groups for copolymers are hydroxy and methoxy.

Polysaccharides

Polysaccharides useful in the compositions described herein are selected from the group consisting of amylopectin from maize, and soluble starch. Soluble starch useful in the invention is a high molecular weight, water-soluble dextrin produced by the partial acid hydrolysis of starch, having the CAS #[9005-84-9]. Suitable soluble starch is available from M.P. Biochemicals LLC, Solon Ohio. Suitable amylopectin from maize corresponds to CAS #[9037-22-3], and is available from M.P. Biochemicals LLC, Solon Ohio.

Polysaccharides used in these compositions should be free or substantially free of compounds that destabilize acetal resins. Destabilizing impurities in commercially available polysaccharide compounds can be assayed by: (1) the pH of an aqueous suspension of 1-10 weight percent polysaccharide; (2) the non-volatile ash content of the polysaccharide; and/or (3) the heavy metal content of the polysaccharide.

For maximum thermal stability results in the compositions described herein, the non-volatile ash content and the heavy metal content of the polysaccharide should be minimized in these compositions. For example, the non-volatile ash content (ashing conducted at greater than or equal to 800° C.) of the polysaccharide should be less than 0.25%, more preferably less than 0.10%, and most preferably less than 0.02% and the heavy metal content of the polysaccharide should be less than 10 ppm.

The polysaccharides used in these compositions should be free or substantially free of acidic materials. This means that, for optimum results, the pH of an aqueous suspension of 1 to 10 weight percent of the polysaccharide should be between 5.5 to 7 for homopolymer polyacetal and between 5.5 to 8 for copolymer polyacetal and more preferably 5.5 to 7 for both homopolymer and copolymer polyacetal.

Polymeric Stabilizers

The polymeric stabilizers containing formaldehyde reactive nitrogen groups, which may be used in the compositions described herein are disclosed in U.S. Pat. No. 5,011,890, hereby incorporated herein by reference. The polymeric stabilizer can be a homopolymer or copolymer and preferably has at least ten repeat units and a weight average molecular weight of greater than 5,000, more preferably greater than 10,000. The polymeric stabilizer should be non-meltable at the temperatures at which the polyacetal is melt processed.

The formaldehyde reactive nitrogen groups can be incorporated into the polymeric stabilizer using an appropriate nitrogen containing monomer, such as acrylamide and methacrylamide. Preferred nitrogen-containing monomers are those that result in the polymeric stabilizer containing formaldehyde reactive nitrogen groups, wherein there are two hydrogen atoms attached to the nitrogen. The particularly preferred monomer is acrylamide which, when polymerized, results in a polymeric stabilizer having substantially all of the formaldehyde reactive nitrogen groups attached directly or indirectly as a side chain of the polymer backbone.

Alternatively, the formaldehyde reactive nitrogen groups can be generated on the polymeric stabilizer by modification of the polymer or copolymer. The formaldehyde reactive nitrogen groups may be incorporated by either method as long as the resultant polymer prepared from these is non-meltable, or is capable of being made non-meltable, at the temperature at which the polyacetal is melt processed.

The number of formaldehyde reactive nitrogen groups in the polymeric stabilizer is preferably determined by the fact that the atoms in the polymer backbone to which the formaldehyde reactive groups are directly or indirectly attached are separated from each other by not more than twenty chain atoms. Preferably, the polymeric stabilizer will contain at least one formaldehyde reactive nitrogen group per each twenty carbon atoms in the polymer backbone. More preferably, the ratio of formaldehyde reactive nitrogen groups to carbon atoms in the backbone will be 1:2 to 1:10, and even more preferably 1:2 to 1:5.

The polymeric stabilizer may be a homopolymer or a copolymer. Preferably, the polymeric stabilizer is polymerized from acrylamide or methacrylamide monomer by free radical polymerization and comprises at least 75 mole percent of units derived from acrylamide or methacrylamide, more preferably, at least 90 mole percent of the above units, even more preferably at least 95 mole percent of the above units, and most preferably, at least 99 mole percent of the above units.

As a copolymer, i.e., polymerized from more than one monomer, the polymeric stabilizer may comprise a co-monomer that may or not contain formaldehyde reactive nitrogen groups. Examples of other monomers that may be incorporated into the polymeric stabilizer include styrene, ethylene, alkyl acrylates, alkyl methacrylates, N-vinylpyrrolidone, and acrylonitrile.

The polymeric stabilizer that is a copolymer must be non-meltable, possess the required quantity of formaldehyde reactive nitrogen groups in the required ratio, and have the required number average particle size. The co-monomer preferably should be added such that it does not unduly minimize the number of moles of formaldehyde reactive groups or the number of formaldehyde reactive sites, each measured per gram of polymeric stabilizer. Specific preferred stabilizers that are copolymeric include copolymers of hydroxypropyl methacrylate with acrylamide, methacrylamide, or dimethylaminoethyl methacrylate. Most preferred polymers containing formaldehyde reactive nitrogen groups are polyacrylamide and polymethacrylamide The polymers containing formaldehyde reactive nitrogen groups are preferably present in about 0.05 to about 3 weight percent, or more preferably in about 0.1 to about 1 weight percent, based on the total weight of the composition.

Hydroxy-Containing Polymers

The hydroxy containing polymers used in these compositions is a polymer or oligomer in which the atoms in the polymer backbone to which the hydroxy groups are directly or indirectly attached and optionally are separated from each other by not more than twenty chain atoms. Preferably, the hydroxy containing polymer or oligomer contained on average at least one hydroxy group per each twenty carbon atoms in the backbone of the polymer or oligomer and not more than one hydroxy group per carbon atom in the backbone. More preferably, the ratio of hydroxy groups to carbon atoms in the backbone will be 1:2 to 1:10, and most preferably 1:2 to 1:5.

Specific, preferred hydroxy containing polymers include poly(vinyl alcohol), poly(ethylene vinyl alcohol), hydroxyesters of poly(meth)acrylates, such as poly(hydroxypropyl methacrylate) or poly(hydroxyethyl methacrylate), and vinyl alcohol/methylmethacrylate copolymers.

Additives

These compositions may comprise one or more additive components that can include 10 to about 40 weight percent impact modifiers; about 0.1 to about 1 weight percent lubricants; about 0.5 to about 5 weight percent plasticizers; about 0.01 to about 2 weight percent antioxidants; about 3 to about 40 weight percent fillers; about 1 to about 40 weight percent reinforcing agents; about 0.5 to about 10 weight percent nanoclays; about 0.01 to about 3 weight percent thermal stabilizers; about 0.05 to about 2 weight percent ultraviolet light stabilizers; about 0.05 to about 3 weight percent nucleating agents; about 0.03 to about 1.0 weight percent mold release agent. Moreover, any other suitable additive or combination of additives may be included so long as it enhances the appearance, the physical properties or the thermal stabilization of the composition. The weight percent of each additive is based on the total weight of the composition.

The following list of additives is illustrative, not definitive. Suitable impact modifiers include thermoplastic polyurethanes, polyester polyether elastomers, and core-shell acrylate polymers. Suitable lubricants include silicone lubricants such as dimethylpolysiloxanes and their derivatives; oleic acid amides; alkyl acid amides; bis-fatty acid amides such as N,N'-ethylenebisstearamide; non-ionic surfactant lubricants; hydrocarbon waxes; chlorohydrocarbons; fluorocarbons; oxy-fatty acids; esters such as lower alcohol esters of fatty acids; polyvalent alcohols such as polyglycols and polyglycerols; and metal salts of fatty acids such as lauric acid and stearic acid. Preferred antioxidants are hindered phenol antioxidants such as Irganox® 245 and 1090 available from Ciba. Suitable fillers include minerals such as precipitated calcium carbonate, talc, and wollastonite. Thermal stabilizers include calcium carbonate, magnesium carbonate, and calcium stearate. Suitable reinforcing agents include glass fiber, carbon fiber and combinations of these. Nucleating agents include titanium oxides and talc. Ultraviolet light stabilizers include benzotriazoles, benzophenones, aromatic benzoates, cyano acrylates, and oxalic acid anilides.

Making and Using the Compositions Described Herein

The thermally stabilized polyoxymethylene compositions described herein are made by melt-blending the components using any known methods. The component materials may be mixed to homogeneity using a melt-mixer such as a single or twin-screw extruder, blender, kneader, Banbury mixer, etc. to give a resin composition. Alternatively, a portion of the materials may be first mixed in a melt-mixer, with the remainder then added and further melt-mixed until homogeneous.

These compositions may be molded into articles using any suitable melt-processing technique. Known melt-molding methods include extrusion molding, blow molding, injection blow molding, which is preferred, and injection blow molding, more preferred. These compositions may be formed into films and sheets by extrusion to prepare both cast and blown films as well as formed into fibers and filaments. The sheets may be further thermoformed into articles and structures, which like the fibers and the filaments, may be oriented from the melt or at a later stage in the processing. Specific extruded articles include gears, toys, and the housings for lighters and pens.

EXAMPLES

Materials

The components used in the compositions of the examples and comparative examples are listed below. The abbreviations listed are used in Table 1.

Resin A is Delrin® 500, a polyacetal homopolymer having a weight averaged MW of 37,000 supplied by E.I. du Pont de Nemours, Wilmington Del. Resin B is polyacetal masterbatch containing Delrin® 500 (98.99 parts), Emulgen 8700 (0.88 parts), Irganox 245FF (0.10 parts) and Acrawax C (0.030 parts).

Soarnol® A (S) poly(ethylene/vinyl alcohol) copolymer has a MW 67,000 and is supplied by Nippon Gosei, Japan.

Irganox® 245FF hindered phenolic stabilizer is supplied by Ciba Specialty Chemicals, Ardsley, N.Y.

Emulgen® 8700 lubricant is supplied by KAO Specialties America Acrawax C mold release agent is supplied by Lonza Chemicals Soluble Starch: (SS) a stabilizer additive supplied by M.P. BioChemicals LLC, Solon Ohio, Cat #195048, CAS [9005-84-9]; is a high molecular weight, water soluble dextrin produced by the partial acid hydrolysis of starch.

Amylopectin from Maize (AM) is stabilizer additive supplied by M.P. BioChemicals LLC, Cat #152582, CAS #[9037-22-3].

Microcrystalline Cellulose FD100 (MCC) is additive supplied by FMC Biopolymers.

Beta-Cyclodextrin (CYC), or kleptose, is a stabilizer supplied by Roquette America Inc, Keokuk, Iowa.

Poly(acrylamide) (PA) was prepared via conventional dispersion polymerization of acrylamide monomer (100 g) and poly(ethyleneglycol) [Mw=8,000] dispersant/stabilizer (15 g) in methanol (500 mL), at a temperature of 71° C. Polymerization was initiated via addition of azobisisobutyronitrile (0.04 g) under mechanical stirring, followed by repeated addition of five subsequent initiator aliquots, 0.02 g each, spaced every 20 minutes. After 3 h of stirring, the resulting stabilizer mixture was isolated as a free flowing white powder (<0.25 μm particle diameter) via direct spray drying.

Methods

Sample Preparation

Samples Resin B masterbatch were prepared by melt compounding the component ingredients in an extruder.

All compounding was carried out on a 30 mm Werner and Pfleiderer twin screw co-rotating extruder (Bilobal Design) at a temperature of about 190° C., a screw speed of about 200 rpm, and a head pressure of about 20-60 psi. All materials were fed into the rear of the extruder. The resulting extrudates were quenched in a water bath and pelletized. The pellets were subsequently oven dried and injection molded into test specimens.

Thermal Stability

In the following examples, thermal stability of the compositions was evaluated using the following method:

Thermally Evolved Formaldehyde (TEF) was determined using the following procedure. A weighed sample of the polyacetal composition to be tested was placed in a tube and the tube was fitted with a cap for introduction of nitrogen to the test sample and for the removal of any evolved gases from the apparatus while maintaining the sample in an oxygen-free environment. The sample was heated at 259° C. in a silicone oil bath. The nitrogen and any evolved gases were transported and bubbled through 75 mL of an aqueous 40 g/L sodium sulfite solution. Any evolved formaldehyde reacts with the sodium sulfite to liberate sodium hydroxide. The sodium hydroxide was continuously neutralized with standard 0.1 N HCl. The results were obtained as a chart of mL of titer versus test time. The percent evolved formaldehyde was calculated by the formula $$(V)(N)[0.03 \times 100/SW],$$

where

V is the volume of titer in milliliters

N is the normality of the titer

SW is the sample weight in grams

The factor "0.03" is the milliequivalent weight of formaldehyde in g/milliequivalent.

TEF results are reported after thirty minutes of heating. The results are reported in the tables under the heading of TEF.

Air Oven Aging (AOA)

Compositions were molded into ⅛ inch thick tensile bars. The tensile bars of each composition were pre-weighed and placed in a circulating air oven at 120° C. for the times noted in Table 1 below. Oven location effects were averaged by continuously rotating the bars on a carousel. At the end of the specified time period, the tensile bars were removed from the oven, weighed, and tested for tensile strength and elongation according to ASTM Method D-638 (0.2 in/min. crosshead speed). The percent weight loss was calculated as [1-(weight after aging)/(weight before aging)]×100.

Yellowness Index

ASTM E31 3-73 (D 1925) Yellowness Index method was used to assess the yellowness of the samples of molded tensile bars after 7 days aging at ambient conditions. Yellowness is defined as the attribute by which an object color is judged to depart from colorless or a preferred white toward yellow. Negative values denote blueness. A Gretag/Macbeth Color-Eye 7000 spectrophotometer and ProPallette® v5.1.3 software were used to obtain the data. Transmission mode, using a D65 illumination source, and a 2° observer angle was used.

Examples 1-4

Table 1, Examples 1-4, list formulations wherein soluble starch is included as a stabilizer in polyoxymethylene compositions.

Table 1, Examples 5-8, list formulations wherein amylopectin is included as a stabilizer in polyoxymethylene compositions.

Table 1, Comparative Examples C1-C3 lists formulations wherein Soarnol® A, a hydroxy containing polymer, is used as stabilizer.

Table 1, Comparative Examples C4-C7 lists formulations wherein microcrystalline cellulose is included as a stabilizer.

Table 1, Comparative Examples C8-C11 lists formulations wherein cyclodextrin is included as a stabilizer.

To minimize the affect of variations in compounding methods, all the above examples and comparative examples were compounded under the same conditions using the sample preparation method disclosed above.

Table 1, Comparative examples C12-C14 are controls with no stabilizer, a hindered phenolic stabilizer; and a polyacrylamide and hydroxyl containing polymer as stabilizers; respectively.

Examples 1-8 show a combination of good AOA, TEF-T stability and Yellowness index. For instance, Examples 1-8 exhibit among the best TEF-T properties, comparable to C4-C7 (MCC samples); However, Examples 1-8 exhibit Yellowness Indexes substantially lower than that of C4-C7 (MCC samples), indicating less yellowing of the polymer composition upon melt processing and molding.

Examples 1-8 also exhibit significantly lower TEF-T results as compared to C1-C3 (Soarnol A) and C8-C11 (cyclodextrin) indicating that Examples 1-8 have improved heat stability over hydroxyl containing polymer or cyclodextrin stabilized compositions.

Additionally, Example 3 exhibits improved TEF and AOA results over Examples 1 or 2, except with yellowness index, indicating that the combination of soluble starch and polyacrylamide is a preferred heat stabilizer. Furthermore, Example 4 indicates that addition of a hydroxyl containing polymer (Soarnol A), leads to further improvement in AOA and TEF-T, indicating that the combination of soluble starch, polyacrylamide and hydroxyl containing polymer is a preferred heat stabilizer composition. Similar trends are exhibited with amylopectin in comparison of Examples 7 and 8 with Examples 5 or 6.

TABLE 1

Heat Stability of Polyoxymethylene Compositions Containing Various Heat Stabilizers

| Ex # | Resin | Stabilizer, wt % | PA, wt % | Soarnol ® A, Wt % | AOA 1000 h, % wt loss | TEF-T | Yellowness Index |
|---|---|---|---|---|---|---|---|
| 1 | A | SS, 1.0 | — | — | 15.41 | 0.694 | −0.43 |
| 2 | B | SS, 1.0 | — | — | 15.78 | 0.301 | 0.330 |
| 3 | B | SS, 1.0 | 0.63 | — | 8.01 | 0.181 | 0.740 |
| 4 | B | SS, 1.0 | 0.63 | 0.15 | 4.60 | 0.187 | 1.430 |
| 5 | A | AM, 1.0 | — | — | 11.35 | 0.810 | 0.200 |
| 6 | B | AM, 1.0 | — | — | 11.09 | 0.474 | 1.000 |
| 7 | B | AM, 1.0 | 0.63 | — | 5.89 | 0.249 | 1.800 |
| 8 | B | AM, 1.0 | 0.63 | 0.15 | 4.07 | 0.247 | 1.820 |
| C1 | A | S, 1.0 | — | — | 50.70 | 1.450 | −0.370 |
| C2 | B | S, 1.0 | — | — | 9.99 | 1.090 | −0.010 |
| C3 | B | S, 1.0 | 0.63 | 0.15 | 6.01 | 0.525 | 0.260 |
| C4 | A | MCC, 1.0 | — | — | 14.57 | 0.650 | 2.990 |
| C5 | B | MCC, 1.0 | — | — | 17.28 | 0.414 | 3.020 |
| C6 | B | MCC, 1.0 | 0.63 | — | 7.33 | 0.197 | 4.870 |
| C7 | B | MCC, 1.0 | 0.63 | 0.15 | 5.57 | 0.206 | 5.280 |
| C8 | A | CYC, 1.0 | — | — | 2.85 | 1.966 | −0.460 |
| C9 | B | CYC, 1.0 | — | — | 4.52 | 2.680 | 0.130 |
| C10 | B | CYC, 1.0 | 0.63 | — | 2.66 | 1.543 | 0.400 |
| C11 | B | CYC, 1.0 | 0.63 | 0.15 | 2.01 | 0.593 | 1.570 |
| C12 | A | — | — | — | 34.96 | 2.25 | −0.74 |
| C13 | B | — | — | — | 39.50 | 1.440 | −0.630 |
| C14 | B | — | 0.63 | 0.15 | 4.92 | 0.167 | 0.200 |

SS = soluble starch,
AM = amylopectin, from maize,
S = Soarnol ® A hydroxy copolymer,
MCC = microcrystalline cellulose,
CYC = cyclodextrin,
PA = polyacrylamide

What is claimed is:

1. A polyoxymethylene composition comprising
(a) 90 to 99.9 weight percent of at least one polyoxymethylene polymer, and
(b) 0.1 to 10 weight percent of at least one polysaccharide selected from amylopectin and amylodextrin;
wherein the weight percent of each of a) and b) is based on the total amount a) and b); and
(c) optionally, 0.1 to 3.0 weight percent of a polymeric stabilizer containing formaldehyde reactive nitrogen groups;
d) a hydroxyl containing polymer selected from the group consisting of poly(vinyl alcohol), poly(ethylene vinyl alcohol), poly(hydroxyethyl methacrylate), poly(hydroxypropyl methacrylate), and hydrolyzed vinyl acetate/methacrylate copolymer;
(e) optionally, 1 to 40 weight percent of reinforcing agents, wherein the weight percent of each of (c), (d) and (e) is based on the total composition; and
wherein the pH of an aqueous suspension of 1 to 10 weight percent of the polysaccharide (b) is 5.5 to 8.

2. The composition of claim 1, wherein the polymeric stabilizer containing formaldehyde reactive nitrogen groups is polyacrylamide or polymethacrylamide.

3. The composition of claim 1, wherein the reinforcing agent is selected from the group consisting of glass fiber, carbon fiber, and combinations of these.

4. The composition of claim 1, further comprising an additive selected from the group consisting of (i) impact modifier, (ii) lubricant, (iii) antioxidant, (iv) nanoclay, (v) nucleating agent, (vi) flame retardant and (vii) mold release agent.

5. An article made from the composition of claim 1.

6. An article made from the composition of claim 4.

* * * * *